United States Patent

[11] 3,542,443

| [72] | Inventor | Phillip R. Eklund<br>Dayton, Ohio |
|---|---|---|
| [21] | Appl. No. | 770,995 |
| [22] | Filed | Oct. 28, 1968 |
| [45] | Patented | Nov. 24, 1970 |
| [73] | Assignee | The United States of America as represented by the Secretary of the Air Force |

[54] UNLUBRICATED BALL AND ROLLER BEARINGS
5 Claims, 4 Drawing Figs.

[52] U.S. Cl. .................................................. 308/187
[51] Int. Cl. ........................................................ F16c 33/66
[50] Field of Search ............................................ 308/N, 238, L, 201, 193, 187; 29/148AC

[56] References Cited
UNITED STATES PATENTS

| 3,001,837 | 9/1961 | Lamson et al. ................ | 308/201 |
| 3,212,832 | 10/1965 | Mayer et al. ................... | 308/L |

Primary Examiner—Fred C. Mattern, Jr.
Assistant Examiner—Frank Susko
Attorneys—Harry A. Herbert, Jr. and Arthur R. Parker ABSTRACT: A relatively thin, monomolecular type of fluorocarbon film deposited on the rolling contact elements of a ball or roller bearing member to thereby form substantially frictionless bearing surfaces that inhibit excessive wear, skidding and galling. A teflon composition retainer is used in combination therewith to insure a continual redeposit or resupply of film to the bearing rolling contact elements, and thus significantly increase the normal operating life thereof.

Patented Nov. 24, 1970 3,542,443
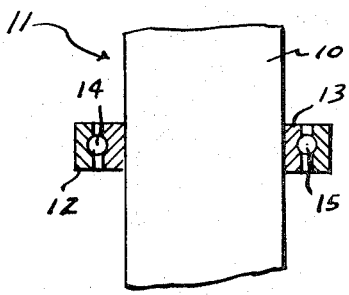
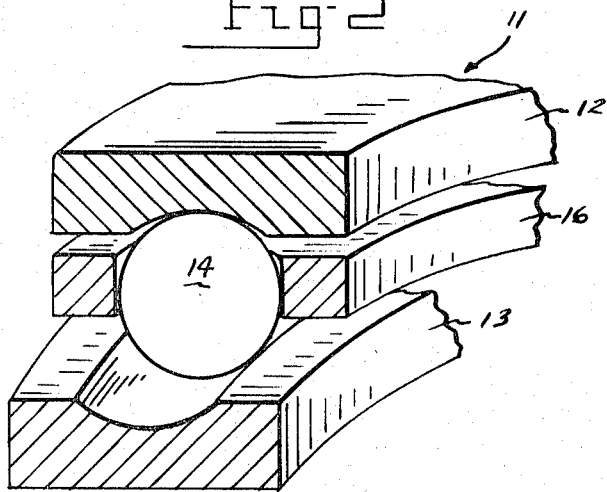
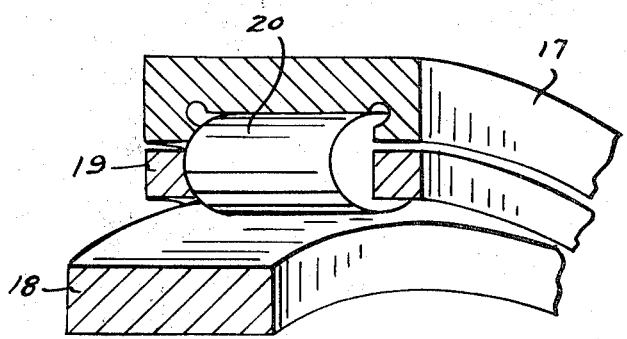
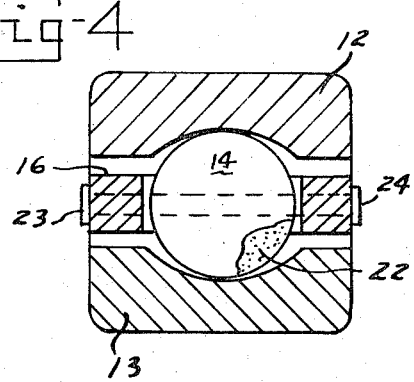
INVENTOR.
PHILLIP R. EKLUND
BY Harry A. Herbert Jr.
ATTORNEY
Arthur R. Parker
AGENT 3,542,443

UNLUBRICATED BALL AND ROLLER BEARINGS

BACKGROUND OF THE INVENTION

This invention relates generally to the field of ball and/or roller bearings and, in particular, to the coating of the bearing surfaces with a relatively thin film of substantially frictionless and wear-resistant material.

In certain types of bearing applications, such as in cryogenic systems, the use of fluid lubricants is not desirable and, in fact, may even be unworkable in many instances. In the cryogenic-type of application, it has been found more feasible to apply some kind of film-coating to the bearing surfaces. This coating, of course, should be both of a frictionless type and, at the same time, have good wear-resistant qualities. This would also be true, even in noncryogenic applications, where the loss or inoperativeness of the lubricant would be immediately critical. An example of the latter occurs in the case of helicopter transmissions where, obviously, a sudden loss of lubricant would be catastrophic.

Previous developments in the area of unlubricated ball and/or roller bearings has involved the use of the so-called "dry-films", wherein a powdered material such as graphite or molydenum disulfide has been utilized, either taken along, or in combination with each other, or with some other material of similar characteristics. This dry film material is normally mixed in a carrier-type vehicle, and thereafter applied to the bearing surface to be coated thereby and then baked until the said carrier vehicle is evaporated to thereby leave a dry film on the coated surface of approximately 0.001 to 0.002 inches in thickness. Although the latter process provides some degree of lubrication, it suffers the major disadvantage of having a quite limited wear life since it is rather easily used up in service, with no provision normally being made for its renewal. On the other hand, the development of the present invention provides an improved film coating that is both longer-wearing, substantially frictionless, and further provides for an automatic resupply of the frictionless material, as it is used up during operation, in the specific manner to be hereinafter described in detail in the following summary and description thereof.

SUMMARY OF THE INVENTION

The present invention, therefore, consists essentially of a unique thin, monomolecular type of film consisting of a fluorocarbon which is deposited in spray form on the bearing surfaces of a bearing assembly. When sprayed on said bearing surfaces and thereafter baked at a predetermined temperature of 650°F. to 680°F. for a specified period of time, a thin, transparent film of increased wearability and reduced friction is formed on the surface structure of the particular bearing member. Further, in operation, both skidding and galling are inhibited by the present coating. Moreover with the use of fluid-type lubricants, a substantial break-in period is normally required before operation under full-loads may begin, whereas, with the present coating, immediate full-load operation is assured at the start.

A particularly unique feature of the present invention resides in combining a teflon composition retainer element with the aforementioned film-coated bearing members. In this manner, a simplified and yet new and novel means of continually resupplying or replenishing the substantially frictionless material, normally lost due to wear, is assured.

Other features, objects and advantages of the invention will become readily apparent from the following description thereof, in which:

BRIEF DESCRIPTION OF THE DRAWING

FIG. 1 illustrates one form of a motor shaft arrangement, shown in schematic and partly broken-away condition, to which the ball or roller bearing member of the present invention may be applied;

FIG. 2 represents a schematic and partly broken-away, sectional view of one type of ball bearing arrangement to which the improved film-depositing method of the present invention may be applied;

FIG. 3 illustrates another schematic and partly broken-away, sectional view of one type of roller bearing arrangement to which the present invention may be applied; and FIG. 4 is still another sectional view, showing the surface structure of the ball bearing member utilized therewith partly cutaway to thereby schematically depict the film deposit of the present invention applied thereto.

DESCRIPTION OF THE PREFERRED EMBODIMENT

Referring to the drawing and, in particular to FIG. 1 thereof, the improved rolling contact-bearing member of the present invention is illustrated therein as being preferably applied, in one form thereof, to a motor-drive shaft, indicated in broken away form at the reference numeral 10. The latter element may constitute the motor shaft of a minature type cryogenic refrigerating machine or cryogenerator compressor. In the aforesaid FIG. 1, the rolling contact-bearing member is depicted as including a series of ball bearing elements, two of which are shown at 14 and 15, respectively. These elements 14, 15 may be incorporated in an overall bearing assembly, indicated generally at 11, and further including the outer and inner races at 12 and 13, respectively. In FIG. 2, a more detailed showing is made of that portion of the said ball bearing assembly 11 which includes the ball bearing element 14. In this view, a retainer element is illustrated at the reference number 16. Of course, element 16 is used to maintain ball bearing elements, such as at 14, in their correct bearing position in the outer and inner races 12 and 13. In the view of FIG. 3, the previously-mentioned rolling contact-bearing member is depicted as a type of roller bearing application to which the film-coating of the present invention may be just as easily applied. In either case, a unique feature of the present invention resides in making the aforesaid retainer element 16 (FIG. 2) of a teflon composition and combining said teflon composition retainer element with the ball or roller bearing members, such as 14, 15 or 20 (FIG. 3), to thereby uniquely provide for the resupply of the original film coating applied to said bearing member in accordance with the teaching of the present invention, and thereafter used up during the operation thereof. The aforesaid roller bearing application of FIG. 3 includes the outer race 17, the inner race 18 and the previously-referred to teflon composition retainer element provided therein, as is indicated at 19, which retainer element 19 is naturally used to maintain a series of roller bearing elements, one of which is indicated at 20, in their correct bearing position.

As viewed specifically in FIG. 4, the improved film deposit or coating of the present invention, which may be utilized to pretreat the surfaces of either ball, or roller bearing members, or the other bearing surfaces in rolling contact therewith, is indicated in somewhat schematic form at the reference numeral 22 for a cutaway section in the ball bearing element 14. Again, the outer and inner races are shown at 12 and 13, respectively, with the teflon composition retainer element 16 depicted as being held in position by means of the rivets at 23 and 24. The aforementioned film deposit 22 may constitute, as noted hereinbefore, a thin, monomolecular-type, fluorocarbon composition. The latter may be applied to the bearing surfaces in spray form by an suitable spray-type apparatus, such as through use of an aerosol-type container, if desired; however, the specific means of spraying the present composition is unimportant to the present invention and, as such, is therefore neither shown nor further described. In this connection, one type of fluorocarbon spray designated as a mold release agent has been found to deposit a very thin, transparent film upon the initially spray-coated bearing surfaces, which thin film coating is considered to form a complex of metallic fluorides, when combined with, or attached to, the surface structure, and which exhibits very little, if any, frictional resistance. At the same time, this composition inhibits to a substantial degree both excessive wear, skidding, and galling. The complete process of the present invention includes, in addition to the initial spray step, mentioned above, the additional steps of thereafter air-drying the sprayed film deposit on the surface structure of the bearing member being treated, and then baking the dried film deposit for a period of 1 to 2 hours at a temperature of 650°F. to 680°F. The thin, transparent film deposit so formed has been found, from actual service and tests in current progress to be practically frictionless, as noted hereinbefore, and to have a relatively extended wear life capability that is considerably improved over that found for the previously-described dry film method. Another important feature of the film deposit formed by the improved technique of the present invention is that the said film is of such a minimal thickness that it cannot be measured by ordinary measuring equipment and is, therefore, easily applicable to many bearing components in current use, since it neither decreases the radial play normally required in the use of such components, nor requires any increase in the necessary allowances for clearance, as is the usual case with the aforementioned dry film type of coatings.

Thus, the present fluorocarbon-based film, when attached to the said surface structure of the selected bearing component in the unique manner hereinbefore described, offers a unique bearing surface of relatively little friction and of such a prolonged life capability, particularly when used with the previously-described teflon composition retainer element, as at 16, that any previous need for a fluid-type of lubricant has been eliminated. Moreover, equipment using bearings that have been pretreated with the film-depositing method of the present invention, offers the obvious advantage of being capable of starting up immediately under full-load conditions without any break-in period being required. In this regard, it has been found that a particularly suitable filled teflon composition is one that consists of approximately 20 percent by volume of powdered bronze of a 325 mesh size and 5 percent by volume of molydenum disulfide. With this particular composition, a substantially improved operation of the bearings has occurred with only an extremely small amount of wear resulting therefrom, as measured by the loss of weight thereof. Furthermore, the basic ball and roller elements of the invention, as well as the bearing races, may be composed of a particular steel product that has been heat treated and tempered at a temperature of approximately 1,000°F. to a predetermined degree of hardness. In this manner, it is assured that the bearing elements treated by the method of the present invention may be subjected to the aforementioned 650°F. to 680°F. temperature range for a relatively prolonged period to thereby ensure the formation of the previously-described thin, transparent film coating, without, however, significantly reducing the original hardness and thus resistance to wear of the said bearing elements.

Thus, a new and improved bearing component structure has been developed by the technique of the present invention, whereby the normal use of fluid-type of lubricants may be eliminated through the application of the inventive and unique film deposit to pretreat the various bearing components and thereby form an improved substantially frictionless surface structure of increased wearability. Furthermore, the previously-described baking step at the 650°F. to 680°F. temperature, which is utilized to form a thin film deposit, also has the advantage of forming a stress relief of the residual grinding stress that can provide a substantial contribution, in concert with the thin film deposit, towards a successful rolling bearing operation without the application of conventional lubricants.

Although the film depositing technique of the present invention has been specifically described with reference to rolling contact bearings for the purposes of exemplification, it is not limited thereto and it is obvious that other applications thereof may be made without departing from the true spirit or scope of the invention, as defined in the accompanying claims. For example, the combined rolling/sliding contact of gear tooth action may likewise be substantially improved by the film coating means of the invention.

I claim:

1. In a method for forming a bearing assembly having one or more bearing elements, each with an unlubricated-type of substantially frictionless, bearing surface structure exhibiting increased wearability and applicable in both cryogenic and noncryogenic-types of bearing systems, and a retainer member for maintaining said bearing elements in their correctly-oriented bearing positions in the bearing assembly, the steps comprising: initially heat treating and tempering each of said elements at a first, relatively high temperature to a predetermined degree of hardness; subsequently pretreating each of said elements to thereby form an initial, unlubricated-type of surface structure thereon by the additional steps comprising: depositing a film on each of said elements by spraying thereon a relatively frictionless and nonpowdered-type of comparatively long-wearing, monomolecular-type material on the core portion thereof; air-drying the material so sprayed; then baking the previously-sprayed and air-dried material for a predetermined period at a second, relatively high temperature until it is thereby formed into a thin, substantially weightless and dimensionless, transparent coating resistant to wear, inhibiting both galling and skidding and being practically friction-free to ensure the immediate operation thereof under full load and speed conditions and without the use of fluid lubrication, said second-named temperature being substantially reduced over that of said first-named temperature to thereby inhibit any significant reduction in the initial degree of hardness originally imparted to said elements; and thereafter forming the said bearing element-retainer member into a solid, built-in and nonporous-type of film-coating replenishing means positioned within the bearing assembly in slidable contacting relation to each of said bearing elements, said film-coating replenishing means being thereby operable to automatically and substantially continuously transfer and resupply additional coatings of relatively friction-free and nonporous-type bearing material to the surface of each of said elements and thereby replace the film coating initially applied thereto and being expended during operation of the bearing assembly.

2. In a method for forming a bearing assembly having one or more bearing elements, each with an unlubricated-type of surface structure as in claim 1, wherein the film coating sprayed on each of said elements during the film-depositing step comprises a fluorocarbon composition forming a complex of metallic fluorides intimately combining with, partly penetrating and thereby forming a bearing element-surface structure of substantially increased wearability and having only a minimum of frictional resistance to other bearing surfaces in contact therewith.

3. In a method for forming a bearing assembly having one or more bearing elements, each with an unlubricated-type of surface structure as in claim 2, wherein the film-coating replenishing means dispensed during the additional step involved in the resupply of said coating material may further comprise fabricating the retainer member from a teflon composition material structure to thereby ensure the said substantially continuous transfer of relatively friction-free and nonporous-type material to the surface structure of each of said elements.

4. In a cryogenic, or noncryogenic-type bearing assembly, at least one unlubricated-type bearing member having an initially untreated core portion heat treated and tempered at a first, relatively high temperature to a preset hardness; first means for pretreating the surface structure of said bearing member at a second, relatively high temperature significantly lower than that of said first temperature to thereby preserve the preset degree of hardness initially imparted thereto; said first means comprising a substantially frictionless and nonpowdered-type of film-coating material means cojoined with, and forming a surface structure on said bearing member-core portion; said film-coating material means being of a consistency to be sprayed and then baked on said core portion at the said second temperature to thereby form a relatively thin, and substantially weightless and dimensionless, transparent surface structure of increased wear life and exhibiting a friction coefficient reduced to a minimum value below that required for the use of a separate fluid-type lubricant; and a second, nonporous and nonpowdered-type of film-coating material means supported by the bearing assembly in contacting relation with said first means to thereby automatically resupply substantially frictionless-type of bearing material to the surface structure of said bearing member and thus substantially continuously replace the outer surface structure-material being expended during the operation of said bearing assembly; said first, pretreating means comprising a fluorocarbon composition forming a bearing element-surface structure substantially interspersed with a complex of metallic fluorides ensuring an increased resistance to wear and thereby prolonging the operational life of said bearing member.

5. In a cryogenic, or noncryogenic-type bearing assembly; at least one unlubricated-type bearing member having an initially untreated core portion heat treated and tempered at a first, relatively high temperature to a preset hardness; first means for pretreating the surface structure of said bearing member at a second, relatively high temperature significantly lower than that of said first temperature significantly lower than that of said first temperature to thereby preserve the preset degree of hardness initially imparted thereto; said first means comprising a substantially frictionless and nonpowdered-type of film-coating material means cojoined with, and forming a surface structure on said bearing member-core portion; said film-coating material means being of a consistency to be sprayed and then baked on said core portion at the said second temperature to thereby form a relatively thin, and substantially weightless and dimensionless, transparent-surface structure of increased wear life and exhibiting a friction coefficient reduced to a minimum value below that required for the use of a separate fluid-type lubricant; and a second, nonporous and nonpowdered-type of film-coating material means supported by the bearing assembly in contacting relation with said first means to thereby automatically resupply substantially frictionless-type of bearing material to the surface structure of said bearing member and thus substantially continuously replace that outer surface structure-material being expended during the operation of said bearing assembly; said second-named, film-coating, resupply means comprising a solid teflon composition, bearing member-retainer element enclosing and supporting said bearing member in correct orientation in said bearing assembly, thereby facilitating the transfer of a continuous film of practically friction-free, teflon composition material to, and thus replenishing the first-named, substantially frictionless and nonpowdered-type of film-coating material means initially cojoined with, and forming the surface structure of said bearing member.